United States Patent [19]

Fujimoto

[11] Patent Number: 4,540,947
[45] Date of Patent: Sep. 10, 1985

[54] FM SIGNAL DEMODULATING APPARATUS

[76] Inventor: Akira Fujimoto, 12-17, Kamikizaki 5-Chome, Urawa City, Saitama Pref., Japan

[21] Appl. No.: 506,831

[22] Filed: Jun. 22, 1983

[51] Int. Cl.³ .......................... H03D 3/00; H03K 9/06
[52] U.S. Cl. ...................................... 329/50; 329/107; 329/122; 329/126; 375/82; 375/94
[58] Field of Search ................. 329/50, 104, 106, 107, 329/110, 122, 126; 375/25, 80, 82, 94

[56] References Cited

U.S. PATENT DOCUMENTS

| | | | |
|---|---|---|---|
| 3,902,129 | 8/1975 | Boothroyd | 329/107 |
| 3,908,169 | 9/1975 | Tong | 375/82 |
| 3,949,313 | 4/1976 | Tamada et al. | 329/106 |
| 3,962,726 | 6/1976 | DeLand, Jr. | 360/51 |

Primary Examiner—Siegfried H. Grimm
Attorney, Agent, or Firm—Cushman, Darby & Cushman

[57] ABSTRACT

An improved apparatus for demodulating frequency-modulated optical communication signals and magneto-electric signals. The apparatus includes a pulse generator for generating a train of successive timing pulses, a pulse deletion gate circuit for deleting one out of three of the successive timing pulses, an edge pulse generator circuit, a delay circuit for delaying each of the edge pulses, a first counter, a second counter, a detection gate circuit, a first flip-flop circuit, a second flip-flop circuit and a gate circuit responsive to both the output of the first flip-flop circuit and the output of the edge pulse generator circuit. The first counter is adapted to start counting the output pulses of the pulse deletion gate circuit synchronously with one of the edge pulses corresponding to a clock pulse and terminate counting the pulses in response to the arrival of the next clock pulse, while the second counter is adapted to receive the contents of the first counter in parallel and in the form of a complement at the termination of the counting and count the contents according to the timing pulses received from the timing pulse generator.

1 Claim, 5 Drawing Figures

FIG. 3 (PRIOR ART)

FM SIGNAL DEMODULATING APPARATUS

BACKGROUND OF THE INVENTION

The present invention relates to an apparatus for demodulating frequency-modulated optical communication signals and magnetoelectric signals.

Of the digital data recording technics known heretofore, an NRZ (non-return-to-zero) system has been in practical application for a long time. In this system, however, there exist some disadvantages including a considerable variation that may occur in a recording frequency depending on the pattern of data to be recorded, the necessity of a timing signal for demodulation of the data in addition to the desired data signal to be recorded, and strict requirements relative to temporal phase deviation (skew) between the data signal and the timing signal. Under such circumstances, and FM system adapted to achieve improved digital data recording is widely employed today for the purpose of eliminating the disadvantages mentioned aove.

The FM system, which belongs to the category of self-clocking modulation techniques, is advantageous in comparison with the foregoing NRZ system since there never arises a problem with regard to skew and so forth due to the feature thereof that the data is transmitted in the form of a composite signal obtained by mixing the data and a timing signal (which is a clock pulse) with another signal. In demodulating the FM signal, however, when any large variation exists in the bit period of the signal, it is impossible to attain accurate demodulation. In an attempt to eliminate such defects, some improvements have been previously proposed as disclosed in the U.S. Pat. Nos. 3,902,129, 3,949,313 and 3,962,726.

An explanation will be given first with reference to the conventional demodulation system of FIG. 2 and the circuit diagram of FIG. 3 associated therewith. Supposing now that digital data "0011010001" is frequently modulated, its waveform becomes such as shown in FIG. 1. In the FM system, the signal level changes at each boundary of bit frames as illustrated, and when the data bit is "1", a level change further occurs at the intermediate point of each bit frame as well. Consequently, the recording frequency in the case of a bit "1" becomes double that of a bit "0", as shown in FIG. 1. The waveform of FIG. 1 is fed to an input circuit 11 of FIG. 3 to generate pulse trains (a), (b) and (c) shown in FIG. 2. As illustrated, the three pulse trains mutually have a slight timing difference and are composed of data-representing pulses (timing signals) and clock pulses mixed with each other. In FIG. 3, an oscillator 51 serves to generate a succession of pulses having a predetermined period. Labeled as 56 and 57 are frequency dividers. The pulse output of the frequency divider 56 is, for example, one third of the pulse input in number and has a duty cycle of 50 percent; while the pulse output of the frequency divider 57 is one fourth of the pulse input in number. Supposing now that a counter 54 and the frequency dividers 56 and 57 are cleared by the pulse train (b') in the preceding bit frame and the oscillator 51 produces 120 pulses during the present bit frame, then the content of the counter 54 becomes 30 (=120×¼) at the termination of said bit frame. And the numerical value 30 thus obtained is loaded in an up-down counter 53 at the timing (a') of the next bit frame. The content of the up-down counter 53 is subtracted one by one in response to the output of the frequency divider 56 during the related bit frame. Since the output rate of the frequency divider 56 is ⅓, it follows that 40 pulses are obtained therefrom per bit frame, and therefore when the 31st pulse is produced from the divider 56, the counter 53 generates a borrow signal which is utilized as a clock output. Generation of such a borrow signal is effected at a time point of 31/40≈¾ in the bit frame. In FIG. 3, a gate control circuit 55 produces an output signal of (f) (see FIG. 2), and a demodulated-data output circuit 14 consists of a flip-flop. The pulse signal (f) and the input signal (a) are fed to an AND gate 18a, while the pulse signal (f) and the input signal (b) are fed to an AND gate 18b. Subsequently, the outputs of the two AND gates are fed as a set input (S) and a reset input (R) respectively to the flip-flop 14 to provide a data signal of (g) (see FIG. 2) in which the signals (a) and (b) are masked with the pulse signal (f). It is further possible to operate the up-down counter 53 in a count-up mode as well. In such a case, the complement of the output of the counter 54 is loaded in the counter 53 and, in place of the aforementioned borrow output, a carry output is used as a clock output.

In the conventional demodulator circuitry described above, it is necessary to provide, as a timing signal required for counting, timing pulses of ¼ and ⅓ frequencies from the oscillator 51. Therefore, the output frequency of the oscillator 51 needs to be at least four times as high as the frequency of the timing pulses employed. This signifies a great burden in manufacture when assembling the said components in the form of an integrated circuit. Furthermore, in the latest technology with regard to magnetic recording and optical communication, a higher speed is required for processing FM signals through demodulation thereof within a shorter duration of a unit bit frame. And in order to meet such requirements, it naturally becomes necessary to furnish an oscillator of a higher frequency. In the foregoing example where the frequency is altered to 31/40≈¾ by utilizing the borrow or carry signal obtained from the counter 53, when the bit interval is short, there arises a problem that the error amounts to a large proportion and eventually induces an impediment to proper demodulation. In addition, the conventional apparatus sometimes causes incorrect demodulation of continuous FM signals due to bit-interval jitter in the bit frames or disturbance from external noise, which brings about another problem that the demodulation of all the successive FM signals posterior thereto are rendered incorrect.

SUMMARY OF THE INVENTION

The present invention has been accomplished in view of such various problems which were unavoidable in the prior art. The present invention provides, through elimination of the aforesaid disadvantages, an improved FM signal demodulating apparatus equipped with a circuit for defining a mask, a first counter for starting to count by the clock pulse derived from said circuit, a second counter to release said circuit for defining a mask when every digital content thereof becomes "1", and a second flip-flop to release said circuit for defining a mask when one edge pulse corresponding to the date exists under the defining mask.

BRIEF DESCRIPTION OF THE DRAWINGS

Figure 3:
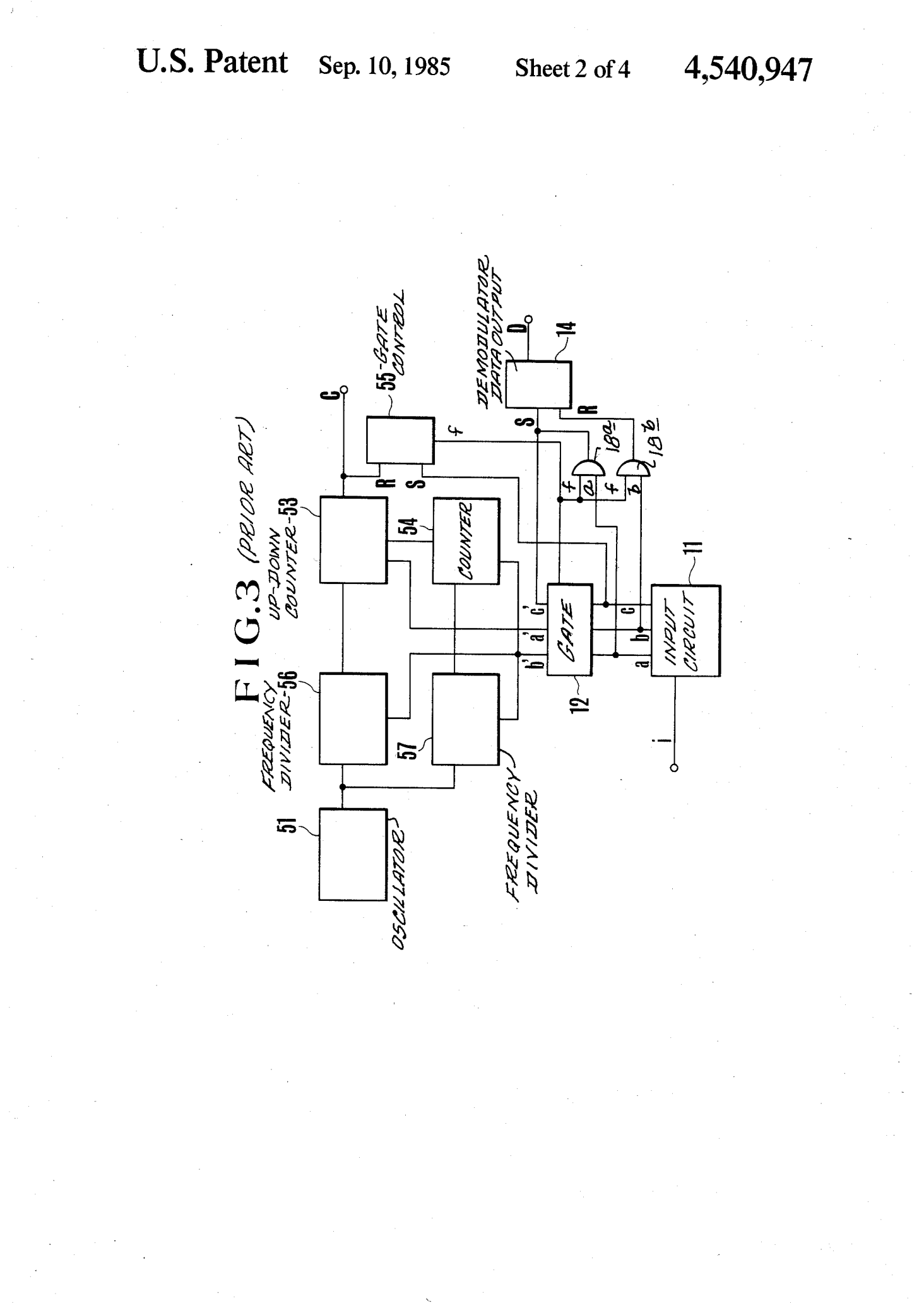

FIG. 3 is a block diagram of a conventional FM signal demodulating apparatus;

DETAILED DESCRIPTION OF PREFERRED EMBODIMENT

Hereinafter the present invention will be described with reference to the accompanying drawings.

Figure 1:
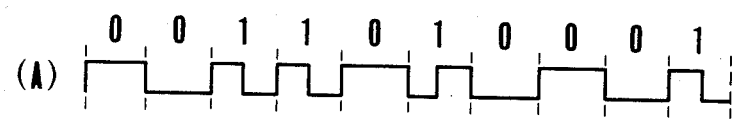
FIG. 1 is a waveform chart showing a frequency-modulated signal.
Figure 2:
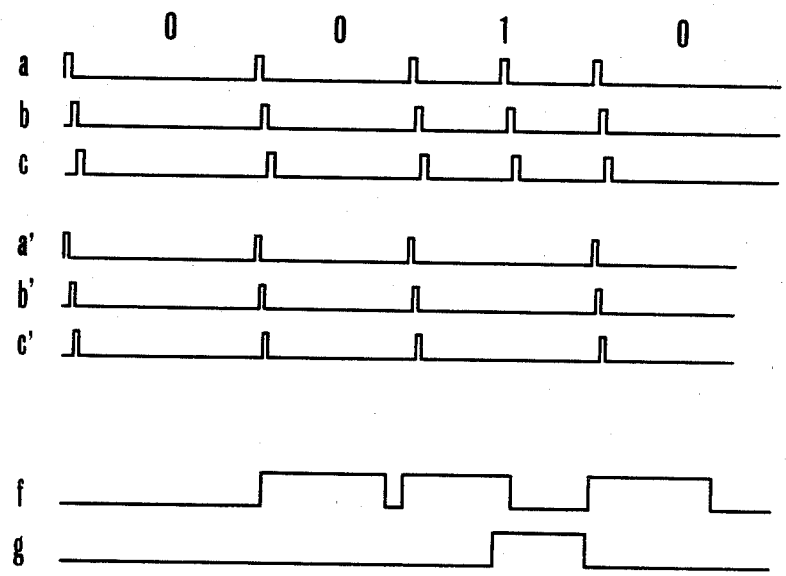
FIG. 2 shows signal waveforms obtained by a conventional FM signal demodulation system.
Figure 4:
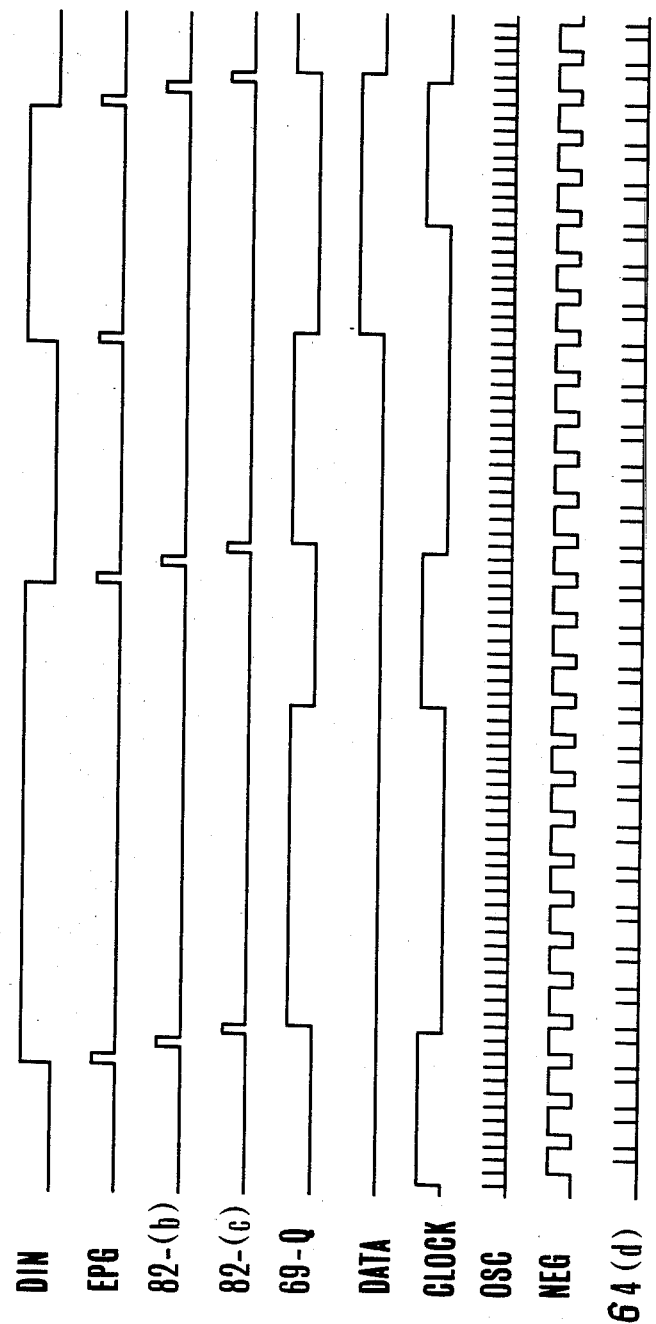
FIG. 4 shows signal waveforms obtained by an FM signal demodulation system according to the present invention.
Figure 5:
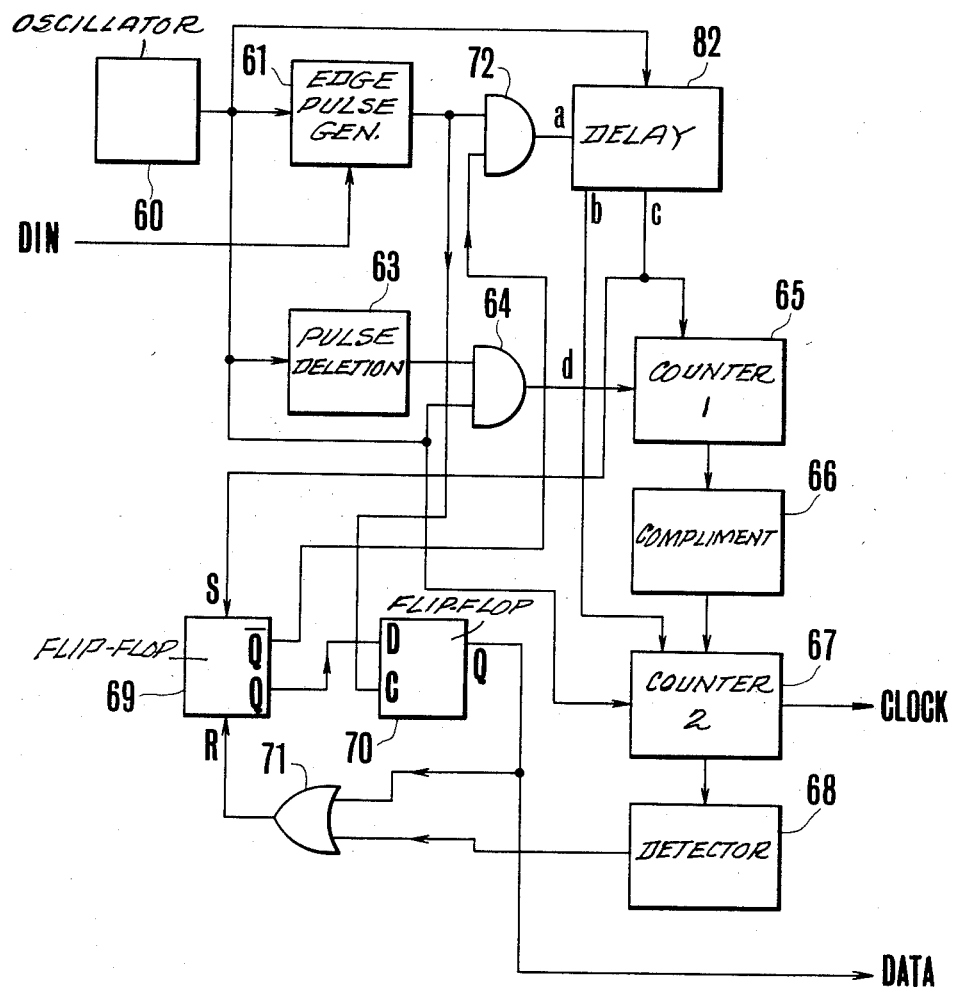
FIG. 5 is a block diagram of an exemplary demodulating apparatus embodying the invention.

FIG. 4 is a waveform chart for explaining the FM signal demodulating apparatus of this invention, and FIG. 5 is a block diagram of an exemplary embodiment thereof. In FIG. 5, an FM signal DIN is fed to an edge pulse generator (EPG) 61, which also receives the output signal of an oscillator (OSC) 60 simultaneously to produce edge pulses (a) corresponding to the rise and fall of the signal DIN. The edge pulses thus obtained include data pulses and clock pulses therein and are introduced to a gate 72 from which only clock pulses are introduced to a next delay circuit 82. Then the time delay circuit 82 generates delayed signals (b) and (c). The output (c) is introduced to a first counter (CNT 1) 65 to clear, and serves to set a first flip-flop 69 for defining the initiation of a mask and then the output $\overline{Q}$ of the first flip-flop 69 closes the gate 72, thereby preventing it from introducing the edge pulse (a) to the delay circuit 82. In the meanwhile, circuits 63 and 64 constitute a pulse deletion gate to delete one out of every three output pulses of the oscillator 60, and each of the post-deletion pulses (d) is fed as a count pulse to the first counter 65. Circuit 63 is a pulse deletion circuit which deletes the above-mentioned pulses, and gate 64 thus provides the post-deletion pulses (d) to counter 65, (see FIG. 4).

The counting operation of the first counter 65 is performed during one bit frame, and the content thereof is loaded in a second counter (CNT 2) 67 via a complement circuit (COMP) 66 by the output signal (b) of the delay circuit 82. The content of the second counter (CNT 2) is then counted up by the pulse output OSC of a predetermined period obtained from the oscillator 60. Subsequently, when a detector circuit (DET) 68 detects that the digital content of the second counter circuit 67 has become all "1"'s the output signal of the detector circuit 68 instantly resets the first flip-flop 69 via an OR circuit 71 for defining the termination of the mask. Thus, it is rendered possible to confirm the presence or absence of the data precisely within a time equivalent to two-thirds of the unit bit interval. Counter 67 also has a clock output which may provide the clock pulse to auxiliary equipment (not shown). When data edge pulses are produced in succession from the edge pulse generator 61 anterior to defining a next mask, the second flip-flop 70 is immediately set to produce an output (Q), which serves to reset the first flip-flop 69 via the OR circuit 71 for defining the initiation of a mask and to provide the data output. In this manner, even when there occurs an abrupt reduction in the bit interval, proper demodulation can be executed if the corresponding bit frame includes a pulse representative of data "1". According to the present invention, any demodulation error is so correctable that, by providing a frame of accurate data "1" during a unit bit frame within the data, the initiation of a mask is synchronized with a clock pulse at the moment of the same frame, hence ensuring proper demodulation for the subsequent data.

Thus, as described hereinabove, the FM signal demodulating apparatus of the present invention is capable of offering a variety of remarkable advantages including that a precise mask width is attainable by the use of a relatively simple circuit configuration without requiring a high frequency, so that the recent requisite of rapid FM signal demodulation can be satisfied with sufficient stability and further instant restoration is achievable from any demodulation error.

While the invention has been described in connection with what is presently considered to be the most practical and preferred embodiment, it is understood that the invention is not to be limited to the disclosed embodiment but, on the contrary, is intended to cover various modifications and equivalent arrangements included within the spirit and scope of the appended claims which scope is to be accorded the broadcast interpretation so as to encompass all such modifications and equivalent structures.

What is claimed is:

1. Apparatus for demodulating digital FM signals, comprising:

means for generating a train of successive clock pulses;

pulse deletion means, connected to said generating means, for deleting every third one of said successive clock pulses to produce post-deletion pulses;

edge pulse generator means, adapted to receive said digital FM signals and connected to said generating means, for generating a plurality of edge pulses in accordance with the rise and fall of said digital FM signal, said edge pulses including data edge pulses and clock edge pulses;

means for delaying each one of said clock edge pulses by a predetermined period of time to produce delayed clock edge pulses;

first counter means, connected to said delay means and to said pulse deletion means, for counting said post-deletion pulses, said counting begins synchronously with one of said delayed clock edge pulses and terminates upon the arrival of a next one of said clock edge pulses;

complement means, connected to said first counter means, for forming complements of said counted post-deletion pulses;

second counter means, connected to said generating means and to said delay means and to said complement means, for counting by "1's" and "0's" said complements in accordance with said successive clock pulses, detection means, connected to said second counter means, for detecting a state where said second counter means contains all "1's";

first flip-flop means, connected to said delay means for defining a beginning and a termination of a mask which synchronizes FM demodulation, said mask beginning is initiated when said first flip-flop means is set by one of said clock edge pulses, said mask is terminated when said first flip-flop means is reset;

second flip-flop means, connected to said first flip-flop means and to said edge pulse generator means and to said detector means, for providing the demodulated digital output and for generating a signal to reset said first flip-flop means synchronously with one of said data edge pulses obtained during a period when said first flip-flop means is set and when said detector means detects all "1's" and;

gate means, connected to said first flip-flop means and to said edge pulse generator means and to said delay means for, providing only the edge pulses corresponding to clock edge pulses to said delay means.

* * * * *